United States Patent [19]

Bakanowsky, III

[11] Patent Number: 5,104,088
[45] Date of Patent: Apr. 14, 1992

[54] DOCUMENT HOLDER CLIP

[75] Inventor: Louis J. Bakanowsky, III, Fitchburg, Mass.

[73] Assignee: Curtis Manufacturing Company, Inc., Jaffrey, N.H.

[21] Appl. No.: 662,482

[22] Filed: Feb. 28, 1991

[51] Int. Cl.⁵ .............................. B41J 11/02
[52] U.S. Cl. .................. 248/442.2; 248/918; 24/545; 24/511
[58] Field of Search ............... 24/487, 545, 557, 67.1, 24/499, 511; 312/7.2; 248/442.2, 918

[56] References Cited

U.S. PATENT DOCUMENTS

D. 301,044  5/1989  Judd .
4,277,863  7/1981  Faneuf .
4,902,078  2/1990  Judd .

FOREIGN PATENT DOCUMENTS 77208415  3/1989  Taiwan .

OTHER PUBLICATIONS

Uni-Clip ® for Hangers Product Literature.

*Primary Examiner*—Kenneth J. Dorner
*Assistant Examiner*—Gerald A. Anderson
*Attorney, Agent, or Firm*—Richard P. Crowley

[57] ABSTRACT

A document holder clip which comprises a right angle support bracket to be secured to the side of a monitor screen, an extending arm pivotably engaged with the support bracket and a document holder clip adaptable for slidable movement on the upper edge of the extending arm, which clip has two generally parallel clip arms and opposing jaw edges and includes a resilient "V"-shaped flat strip biasing element integrally extending from the top of one clip arm and having a free end which fits beneath an inward ridge on the other clip arm, the biasing element resiliently holding the jaw elements at the other end in a biased, closed position and on the application of finger pressure to open the jaws to an open position to permit the insertion of a document.

11 Claims, 1 Drawing Sheet

DOCUMENT HOLDER CLIP

BACKGROUND OF THE INVENTION

Document holder clips are known which permit the retention of a document adjacent to a monitor screen so as to improve data entry and to reduce eye fatigue of a user. Typically, such document holder clip (see for instance U.S. Pat. Des. No. 301,044, issued May 9, 1989) positions a document or copy adjacent to a computer screen monitor so that the eyes of the user will no longer have to refocus from the desktop to the screen monitor. Generally, the document holder clip is secured to one side of the screen monitor generally by the employment of a removable, fabric hook-type fastener, such as Velcro- ® fastener, both on the inside of the right angles of the support bracket of the clip holder and Velcro ® placed onto the side and top of the screen monitor case.

The clip holder generally has an extending arm which is pivotably swivelable at the one end, so that the document clip holder may be swung generally out of the way, such as parallel, to the side of the screen monitor when not in use, and yet may be easily be positioned, for example at a 90 degree position to the screen, when in use to hold the document. The document holder clip contains a clip subject to finger pressure, so that sheets, such as standard paper, may be inserted under the clip and against a solid portion of the extending arm on one side to retain the document in position, and therefore, also conserve desktop space.

A clip holder is also disclosed in Taiwan Pat. application No. 77208415, published Mar. 21, 1989 (publication No. 110,251) in which a metal spring clip is slideably mounted for adjustment along the extending arm.

The document holder clip as illustrated in U.S. Pat. Des. No. 301,044 is so constructed as to show a plastic-type hinge secured to the extending arm with a retaining element so positioned as to be resiliently biased against the viewing side of the extending arm, so that any document to be viewed may be retained between the end of the jaws and the extending arm by the application of pressure to the fixed clip element.

There are a wide variety of clip holders for holding of documents and other items, such as for example identification cards having an aperture therein. One identification card holder of the clip type is illustrated in U.S. Pat. No. 4,277,863, issued July 14, 1981. The clip illustrated is designed for engaging into an aperture on a identification card and employs two stiff, parallel members joined in the middle by a flexible hinge. One of the parallel members has at the other end a spring finger biased toward the other parallel member to bias the jaws at the end of each parallel member into a closed position. The spring finger forms an open loop for engaging into an aperture in an identification card so that the card is offset and permits the card to hang parallel along side the hinged members.

U.S. Pat. No. 4,902,078 issued Feb. 20, 1990 illustrates an improved document clip holder which includes a double jaw slideably mounted clip holder for securing documents on either side of the extending document clip arm. The holder clip is formed of plastic and is easily manufactured in a molding process and then assembled for use. The clip holder includes a spring finger member which on the application of finger pressure slides along a ridge on the inside of the clip to move the clip holder from a tension biased closed document retaining and holding position to an open jaw non-retaining document position.

Another clip for use with clothes hanger is known as UniClip (a registered trademark of PlastiClip Corporation of Amherst, N.H.) has been described in advertising literature.

It is desirable to provide for a new and improved document clip holder which includes an improved easily assembled and produced slideably mounted clip on the extending arm and wherein the clip may be used so that the document sheets can be inserted on either side of the extending arm and used by right or left handed users.

SUMMARY OF THE INVENTION

The invention relates to a document holder clip. In particular, the invention concerns a document holder clip which provides for a improved clip on the upper edge of the extending arm of the document holder clip and which clip with double jaws permits easy positioning of documents on either side of the extending arm and which clip holds the document in an effective and secure manner.

The clip provides for easy assembly of the clip after molding and improved ease in movement of the clip between open and closed positions. The document holder clip as hereinafter described and illustrated is an improvement of the holder clip as illustrated in U.S. Pat. No. 4,902,078. The clip holder has a clip designed to slide along the upper edge of the extending arm of the document holder clip and be securely held by side flanges or the clip may be fixed in position. The clip is designed and constructed so as to have the jaws easily moved from an open, non-retaining position to a closed, secure retaining position of the documents and wherein the documents may be retained on both or either sides of the extending arm so that use of the holder clip by a left or right handed person is facilitated.

The improved document holder clip is adapted to hold a document, preferably on both or one side, adjacent to a monitor screen and which holder comprises in combination: a support bracket means to be secured to the side of a monitor screen case or other support surface; an extending, board-like arm, and which arm has a slideable clip mounted thereon; and the clip slidably moves along substantially the length of the extending arm. The clip is designed in one embodiment to have opposing "C" shaped jaw elements at one end to retain the document between the edge of the jaw element and the surface of the extending arm and which clip element is designed to have the jaw element biased in a tension, closed position, and yet which clip may be easily moved to an open position by the application of finger pressure inwardly to push together the upper ends of the parallel members which make up the clip. The holder clip also contains a means to provide for the pivotable movement of the extending arm about the support bracket and generally on an axis substantially parallel to the one side of the screen monitor case.

The holder clip has an extending arm which includes two separate, slightly extended flanges slightly below the upper edge of the extending arm and extending substantially the length of the extending arm, and which includes a clip which is slidably mounted on the upper edge and secured beneath the flanges so that the clip may be securely and slidably moved along the top edge of the extending arm. The clip includes a pair of parallel members secured together by a hinge generally intermediate of the members, and one end of the members comprising jaw elements which are tensionally biasedly closed in a normal position and wherein the other end of the parallel members are disposed to be moved between an outward position wherein the jaws of the one end are tension-biased by the hinge element against the surface of the extending arm, that is, in a closed, document retaining position, and through the application of inward finger pressure by the user at the other end of the parallel elements to move to an open position and to permit the removal of one document and/or the insertion of another document and the return of the clip to the biased closed position.

The clip includes a generally "V" shaped biasing element having a one and other end, one end being an integral molded extension of the top section of one of the parallel clip members with the other end free. The other opposite parallel clip member has an integral molded ridge on the top section extending inwardly. The free end of the biasing element is adapted to be placed underneath the ridge, which braces the clip ends of the two parallel clip members inwardly into a closed document holder retaining position against the surface of the document holding arm. When the free end of the clip is not in a snapped in biased relationship beneath the ridge, the clip is in an open unbiased position. Generally, the ridge and the free end are of similar width and the one end extends in a loop from the top of the one parallel clip member, while the free end extends in the biased position beneath the ridge extending slightly inwardly from the top edge of the other parallel clip member and with the bottom of the "V" biasing element between the two parallel clip members and extending downwardly just above the hinge or support between the clip members. In operation the clip is retained in a biased closed document retaining position when slid onto the top edge of the document holder arm. On application of inward finger pressure by the user, the "V" shaped plastic biased element is compressed slightly inwardly to move the four edges of the parallel clip members into an open document receiving position.

The clip provides for an improvement both in manufacturing and in ease of assembly over the document holder clip of U.S. Pat. No. 4,902,078. The clip may be readily molded as a single injection molded piece of plastic from a thermal plastic acetal resin like Delrin. The assembly of the clip into the biased position is easily accomplished in production by snapping the free end beneath the ridge element, further the biasing action between open and closed positions is much easier, since there is no frictional engagement between a spring finger and a ridge, but rather merely the flexing of the "V" shaped biasing member. Of course, the type of plastic can be selected to provide for a variety of stiffness in the biasing action as desired with the biasing element being a living biased type hinge.

The clip also contains a pair of "C" type retaining arms extending downwardly from beneath the central hinge so as to grasp the lower side of the flanges on the extending arm, so that the clip may be slid below the hinge along the flanges and so positioned by the user to the desired clip position.

The document holder clip will be described for the purposes of illustration only in connection with certain embodiments; however, it is recognized that various changes, corrections, additions, modifications and improvements may be made by those persons skilled in the art, all falling within the spirit and scope of the invention as illustrated.

DETAILED DESCRIPTION OF THE PREFERRED EMBODIMENT

Figure 1:
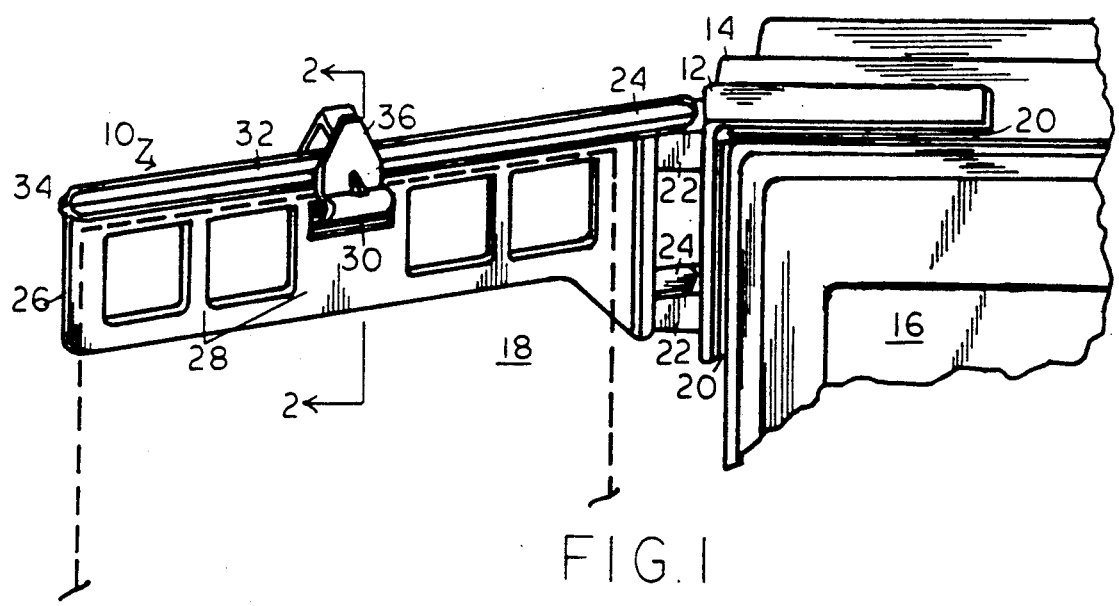
FIG. 1 is an illustrated, perspective view from above of the document holder clip of the invention secured to the side of a monitor screen with a document held in position.

With reference to the drawings, there is shown and illustrated a document holder clip 10 of the invention which includes a right angle bracket support 12 secured through a strip of Velcro ® fastener 20 secured to other side of the bracket support on one layer, and the Velcro ® glued or secured to the left-hand side of a monitor screen case 14 wherein there is a computer monitor screen 16 for the displaying of information. This arrangement provides for the easy removal of the document support holder and the copy holder clip from the side of the monitor screen case 14 and for installation on the opposite side of the monitor screen case 14 with the use of another layer of the Velcro ® fastener 20 on the opposite side of the monitor screen case 14.

As illustrated more particularly in FIG. 1, the document holder clip includes a document 18 shown in dotted lines secured by a clip 36 to a flat, extending arm 26, the extending arm 26 having a generally central, solid section 28 with striations 30 on this section and frictionally retaining the document 18 between the jaws of the clip 36 and the surface of the solid section 28. Of course, if required, the flat extending arm 26 may be solid, that is, the central solid section 28 may extending along substantially the length of the arm 26 with or without the striations 30 thereon so as to provide a solid surface against which the clip 36 may secure a document 18 against the arm.

The flat, extending arm 26 is adapted for pivotable movement about an axis generally parallel to the side of the monitor screen case 14 through the employment of two pivot holders 22 in the side of the bracket 12 and two pivot inserts 24 extending from the one end downwardly of the arm 26 to permit the pivot holders 22 to be inserted in the pivot brackets 24 so that the extending arm 26 may pivot between a use position as illustrated, and for example, a non-use position as illustrated by dotted lines of the clip and wherein the arm 26 extends only adjacent and toward the side of the monitor screen case 14.

The extending arm 26 includes an upper edge 32 with separate short ribs or flanges 34 extending generally outward at right angles from the surface of the extending arm 26 and only slightly below the upper edge, which flanges 34 are used to retain the clip 36 so that the clip may be slidably moved along the upper edge 32 of the extending arm 26 so that the document 18 may be laterally positioned as desired.

The plastic molded, slidable clip 36 comprises a pair of generally parallel clip arms 38 and 40 connected together by a central hinge or support bar 42 and which clip arms 38 and 40 have respectively at one end "C" jaws with edges 44 and 46 adapted to grasp and hold a document 18 against the surface of the extending arm 26. either on the front or back or both by jaw edges 44 and 46. The clip 36 also includes integrally molded two retaining arms 48 extending beneath the central support 42 and adapted to encircle partially the extending lower flanges 34 beneath the top upper edge 32 of the extending arm 26 so as to permit the clip to ride on the upper edge substantially rom one to other end of the arm 26. The retaining arms 48 are designed to permit the clip to be retained on the arm 26 by flanges 24 while permitting the clip to slide along the top edge 32 of the arm 26 and may be removed from the one free end of the arm 26 as desired.

Figure 2:
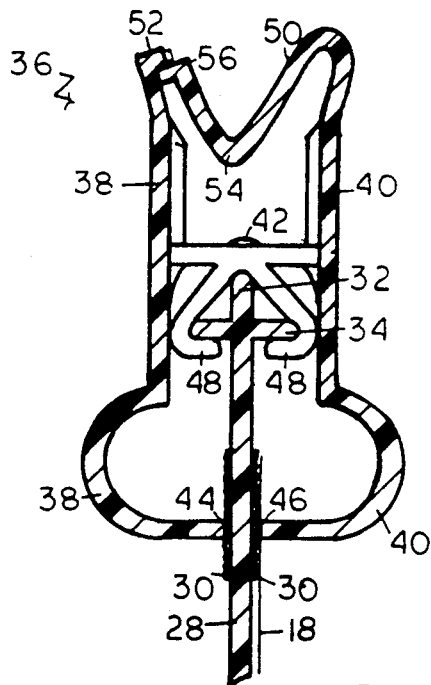
FIG. 2 is an enlarged view of the clip of the document holder of FIG. 1 along line 2—2 showing the clip in a closed, document-retaining position.

The clip 36 includes a "V" shaped biased element 50 having one end extending from and integral with the top of clip arm 40 and forming a generally "V" shape between arms 38 and 40 and an upwardly extending free end 54 with a slight outwardly extending rail 56 shown in a snap-in position against and underneath ridge 52 on clip arm 38, to place the clip in a closed document retaining position holding document 18 against the surface 30 by jaw edge 44. As illustrated in FIG. 2 the outwardly extending rail of the free end 54 is optional, since the free end 54 can rest directly against and beneath ridge 52 however, the rail 56 makes assembly of the clip easier since rail 56 need only be pushed downwardly to assemble the clip.

Figure 3:
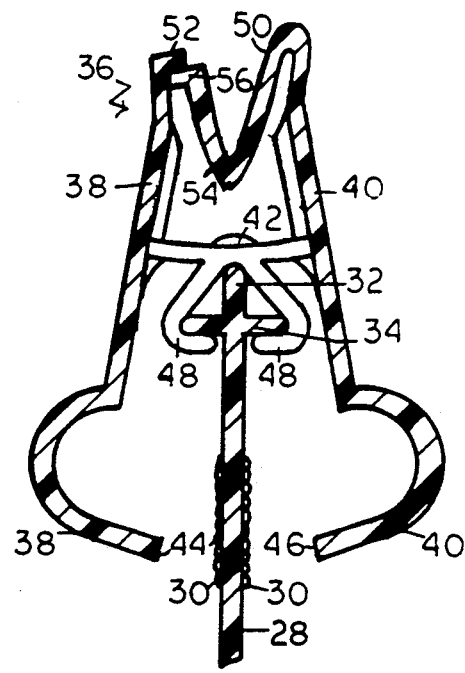
FIG. 3 is an enlarged view of the clip as illustrated in FIG. 2 in an open, document receiving position.

In use, when a new document is being inserted and the old document removed, the user presses together the ends of the parallel arms 38 and 40, as illustrated more particularly in FIG. 3, so as to cause the compression of the lower end of the plastic, resilient, biasing element 50 which forces the jaw edges 44 and 46 into an outwardly disposed, non-document retaining position.

Figure 4:
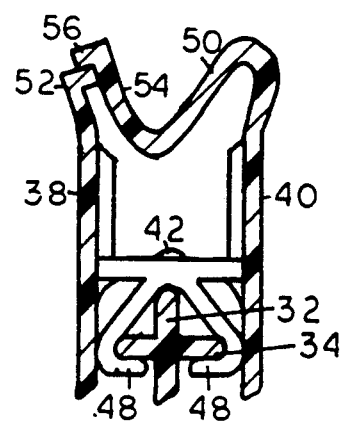
FIG. 4 is a partial enlarged sectional view of the clip as manufactured and prior to assembly.

FIG. 4 is a partial enlarged section of the clip 36 which illustrates the clip after the manufacture and prior to assembly. The clip is placed in the close deposition of FIG. 2 by merely pressing downwardly and inwardly on the top of rail 56 to force the top surface of rail 56 into snug fit under ridge 52 thereby making assembly of the clip quite easy. The document holder clip thus provides manufacturing, assembly and operational advantages over the prior art document holders.

What is claimed is:

1. A document holder clip adapted to hold a document adjacent a monitor screen, which comprises in combination:
   (a) a support bracket means to be secured adjacently to a monitor screen or other fixed support;
   (b) an extending arm having a one and other end and an upper edge with a front and back surface;
   (c) means to provide for the pivotable movement of the extending arm at the one end thereof in relation with the support bracket means to permit the extending arm to be pivotably moved between a use and non-use position; and
   (d) a mounted document clip means to retain a document, which clip means comprises:
      (i) a pair of generally parallel clip arm elements having a one and an other end, the one end forming opposing jaws on either side of the extending arm;
      (ii) a hinge means generally intermediate the parallel clip arm elements;
      (iii) a clip retaining means between the clip arm elements and below the hinge means to retain the mounted document clip means on the arm;
      (iv) a generally "V"-shaped biasing element having a V-shaped section, a one end and an other elongated end, said V-shaped biasing element one end extending from and integral with the clip arm element other end, and the V-shaped biasing element other end extending generally upwardly and free, and the V-shaped biasing element V-shaped section between the generally parallel clip arm elements, and:
      (v) a ridge means extending slightly inwardly from the inner surface of the upper section of the other clip arm element, the V-shaped biasing element other end snapped in place in a non-moveable snap-in position beneath the ridge means biasing the opposing jaws of the clip arm elements in a closed, document retaining position and whereby on the application of inward finger pressure on the clip arm element other ends, the biasing element is compressed inwardly to overcome the V-shaped biasing element and the opposed jaws move to an open, document receiving position, while the free end of the biasing elements remains in said non-moveable snap-in position adjacent the ridge means.

2. The clip of claim 1 wherein the support bracket means comprises a right angle support bracket adapted to be secured to one side of a monitor screen case and which includes a means on the support bracket to secure the support to the monitor screen case.

3. The clip of claim 1 wherein the extending arm includes a solid section and is characterized by a surface on the solid portion to aid frictionally in the retention of a document thereon.

4. The clip of claim 1 the opposed jaws are generally "C"0 shaped.

5. The clip of claim 1 wherein the extending arm comprises a board-like arm having slightly raised flange elements extending outwardly from the front and rear surfaces and substantially the length of the extending arm and slightly below the upper edge of either side of the arm.

6. The clip of claim 5 wherein the clip holder retaining means comprises a pair of partially curved, shaped arms to extend over and beneath each of the flange elements on the extending arms to permit the slidable movement of the upper edge of the arm of the document holder clip.

7. The clip of claim 1 which comprises an integral injection molded wholly plastic clip.

8. The clip of claim 1 wherein the biasing element is a resilient strip material which includes at the V-shaped biasing element other end an outwardly extending rail element, which rail element is adapted to be snapped beneath the ridge means to retain the V-shaped biasing element other end in place and to permit easy assembly.

9. The clip of claim 1 wherein the V-shaped biasing element one end extends upwardly from the clip arm element other end and the ridge means extends upwardly from the other clip arm element other end.

10. The clip of claim 1 which includes a document retained against the surface of the extending arm by the document holder clip means.

11. The document holder clip of claim 1 in document viewing system, which system comprises in combination:
   (a) a case for a monitor screen;
   (b) a monitor screen within the case; and
   (c) the document holder with the support bracket means secured to the one side of the case and a document retained by the document holder clip against the surface of the extending arm to be used by a viewer.

* * * * *